United States Patent

Bergström et al.

[11] Patent Number: 6,054,543
[45] Date of Patent: Apr. 25, 2000

[54] AMORPHOUS OLEFIN CO/TER-POLYMERS

[75] Inventors: Christer Hans Bergström, Espoo; Jukka Seppälä, Helsinki; Juhana Ruotoistenmäki, Helsinki; Tapio Hase, Helsinki; Sari Paavola, Helsinki; Lars-Olof Pietilä, Helsinki; Lisbeth Ahjopalo, Helsinki, all of Finland

[73] Assignee: Optatech Corporation, Espoo, Finland

[21] Appl. No.: 08/930,075

[22] PCT Filed: May 7, 1996

[86] PCT No.: PCT/FI96/00253

§ 371 Date: Jun. 26, 1998

§ 102(e) Date: Jun. 26, 1998

[87] PCT Pub. No.: WO96/35730

PCT Pub. Date: Nov. 14, 1996

[30] Foreign Application Priority Data

May 8, 1995 [FI] Finland ..................................... 952188

[51] Int. Cl.[7] ......................................................... C08F 2/06
[52] U.S. Cl. .......................... 526/160; 526/151; 526/153; 526/170; 526/281; 526/282
[58] Field of Search ..................... 526/160, 151, 526/153, 170, 281, 282

[56] References Cited

U.S. PATENT DOCUMENTS 5,559,199 9/1996 Abe et al. .
5,637,400 6/1997 Brekner et al. .
5,650,471 7/1997 Abe et al. .

FOREIGN PATENT DOCUMENTS 2155937 8/1994 Canada .......................... C08F 232/08
0 591 892 A1 10/1993 European Pat. Off. .
WO 91/18029 11/1991 WIPO .

OTHER PUBLICATIONS

Bergström, Christer H., et al., "Influence of the Polymerization Conditions on the Rigidity of Phenylnorbornene–Ethylene Copolymers Made Using Ethylene bis (indenyl) zirconium dichloride and MAO", *Journal of Applied Polymer Science*, vol. 67, 385–393 (1998) [Encl. 1].

Bergström, Christer H., et al., "Influence of the Polymerization Conditions on Microstructure of Norbornene–Ethylene Copolymers Made Using Metallocene Catalysts and MAO", *Journal of Applied Polymer Science*, vol. 63, 1071–1076 (1997) [Encl. 2].

Bergström, Christer H., "New and Unique Cyclic Comonomers for Improvement of the Technical Performance of Metallocene Catalyzed COC", presented at Met Con '97, Jun. 5, 1997: *Cyclic Olefin Copolymers–Materials and Processes*, ©Christer Bergström, Apr. 7, 1997, unpublished. [Encl. 3].

*Primary Examiner*—Edward J. Cain
*Attorney, Agent, or Firm*—Cohen, Pontani, Lieberman & Pavane

[57] ABSTRACT

Amorphous and impact resistant co/ter-polymer made from olefins and aryl-substituted cyclic monomers by polymerizing using a catalyst, wherein the substituent is a phenyl- or indanyl-group and the catalyst is a metallocene-catalyst. Preferably said aryl-substituted cyclic monomer is phenyl-norbornene (5-phenyl-bicylo-2,2,1-hept-2-ene) or indanyl-norbomene (1,4-methano-1,4,4a,9a-tetrahydrofluorence).

25 Claims, No Drawings

AMORPHOUS OLEFIN CO/TER-POLYMERS

BACKGROUND OF THE INVENTION

The invention is related to the amorphous olefin co/ter-polymers and their manufacture. The invention is especially concerned with the improvement of the softness, flexibility and impact properties of amorphous co/ter-polymers by using substituted cyclic co-monomers.

Cycloolefin—copolymers (COC) are manufactured commercially using metathesis ring-opening polymerization providing thermoplastic COC—polymers with high glass transition temperatures (Tg) and good optical properties (used in compact discs etc.). Furthermore COC—polymers are manufactured commercially by co-polymerizing ethylene and cycloolefins using vanadium type Ziegler-Natta-catalysts, also providing good optical properties and heat resistance, but rather poor impact properties. Also ethylene-cycloolefin-copolymers with high Tg values have been obtained by the use of metallocene catalysts. Based on the patent examples, however, these technologies are focusing on using norbornene or tetracyclododecene as comonomer. Typical for both these co-monomers is the poor impact properties of their COC—polymers. This is due to the fact that the forces between the polymer chains are very weak (van der Waal's forces), because the polymer chains are fully saturated hydrocarbons (paraffinic). Furthermore there is a very low degree of entanglement of these polymer chains due to their stiffness.

THE INVENTION

In the present invention the cyclic comonomer is substituted with a chemical group which increases the forces between the polymer chains as well as decreases the rotation of the cyclic comonomer around the polymer chain (stiffens the chain). When the substituent is a phenyl-group, or any other kind of aromatic group the forces between the polymer chains increase due to the interaction of –electrons. In this respect a non-condensed aromatic group, such as phenyl-group can move more freely and find another phenyl-group in a neighboring chain, which results in improved impact properties which is greater than if the aromatic group is condensed or otherwise linked to the cycloolefin via several bonds (like the indanyl-group). The phenyl-group also reduces the rotation around the polymer chain but not to the extent as when the substituent is linked to the cycloolefin via several bonds (tetracyclododecene, indanyl-norbornene etc.). Less rotation around the polymer chain increases the Tg more efficiently.

By using metallocene catalysts and methylaluminoxane (MAO) as cocatalyst, one can produce amorphous ethylene-co/ter-polymers which have both high heat resistance (high glass transition temperature, Tg) and good impact properties. When ethylene is co-polymerized with phenyl-norbornene, indanyl-norbornene or any other aryl-substituted norbornene, stiffer polymer chains (higher Tg:s) are obtained as when incorporating the same amount of norbornene. In addition one obtains a softer, more flexible and more impact resistant product. The greatest disadvantage with the present cyclo-olefin-coplymers (COC) is their poor impact resistance. Due to the fact that the above mentioned substituted norbornenes have a greater stiffening effect on the polymer chains than norbornene, substantially lower incorporations are needed which is a great advantage from a production as well as economical point of view. Furthermore phenyl-norbornene (5-phenyl-bicyclo-2,2,1-hept-2-ene) is made from styrene and indanyl-norbornene (1,4- methano-1,4,4a,9a-tetrahydrofluorene) from indene using dicyclopentadiene as the other component in a Diels-Alder-reaction. These raw-materials are readily available liquids which are easy to transport and store and also the corresponding cyclic monomers are liquids and can therefore be easily purified and fed to the polymerization process. Norbornene on the other hand is made from ethylene and dicyclopentadiene which requires that the monomer reactor is connected to an ethylene pipe-line or to an ethylene cold-storage and the reactor is able to withstand higher pressures. Draw-backs of norbornene include that it is present in a semisolid state and very intense and has a bad odor.

Using for instance Molecular Modelling, the stiffening effects of different substituted cyclic monomers on the polymer chain have been observed noticed. Due to these effects the heat resistance and impact resistance of ethylene-phenylnorbornene and ethylene-indanyl-norbornene are higher and the hardness lower compared to corresponding ethylene-norbornene-copolymers having the same molar ratios.

The amount of aryl-substituted cyclic monomer in the polymer can vary within a large range. Therefore its concentration can be within 1–90 mol %. In most practical cases, the concentration is from 20–75 mol %.

According to the invention the ansa-metallocene catalysts are suitable catalysts even if Ziegler-Natta catalysts and other suitable polymerization catalysts are also considered. For instance, one can use ethylene bis (indenyl) zirconium dichloride or dimethylsilyl bis (indenyl) zirconium dichloride.

As cocatalyst an alkylaluminoxane like methylaluminoxane (MAO) can be used. The amount of cocatalyst can vary so that the Al/Zr—ratio is in the range of 10–10,000.

The polymerization can be performed in a conventional manner, for instance in a suitable solvent at 10–90° C. for 0.2–20 h.

In the following examples and tables the invention is described more in detail. They are, however, only presented in order to clarify the invention and do not limit the scope of the invention.

EXAMPLE 1

The synthesis of COC—polymers

The appropriate amount of norbornene and/or substituted norbornenes was dissolved in toluene and diluted to 200 ml after which molecular sieves were added in order to absorb water. The next day the solution was poured into a 0.5 l Buchi reactor which was equipped with a thermostat and a stirrer. The reactor was then purged with nitrogen after which the chosen amount of methylaluminoxane (MAO) was added. The reactor was then purged with ethylene and ethylene continued to be added until the solution was saturated at the chosen pressure. The ethylene pressure and temperature were controlled automatically and it was assumed that ethylene dissolved in toluene according to Henry's law. When the toluene solution was saturated with ethylene and the ethylene pressure and temperature were constant the metallocene catalyst was pumped into the reactor as a dilute toluene solution. Polymerization was commenced. The ethylene consumed in the polymerization was automatically replaced so that the ethylene pressure remained constant. When the polymerization was stopped by closing the ethylene feed and venting the reactor, the reactor contents was poured into ethanol and some hydrochloric acid was added. After filtration the polymer was washed with acetone, filtrated again and dried.

EXAMPLE 2

The heat resistance (Tg) and Shore hardness of COC

Ethylene and cyclic monomers (PhN=Phenyl-Norbornene, 5-Phenyl-bicyclo-2,2,1-hept-2-ene:InN=Indanyl-Norbornene, 1,4-Methano-1,4,4a,9a-tetrahydrofluorene:N=Norbornene, Bicyclo-2,2,1-hept-2-ene) were polymerized as explained in Example 1. The toluene solution was 200 ml, the ethylene pressure 3 atm, the temperature 30° C., the catalyst 2 mg ethylene bis (indenyl) zirconium dichloride (catalyst A) and the cocatalyst MAO (Al/Zr=3000). The polymerization time was 1 h. In Table 1 are presented the properties of polymers produced in this manner.

TABLE 1

The heat resistance and hardness of COC

| Run | Comonomer | Yield | Tg | Shore-hardness |
|---|---|---|---|---|
| 1 | 30 mol-% (5,9 g) FN | 14.0 g | <0° C. | 65°A/°D |
| 2 | 50 mol-% (13,8 g) FN | 11.9 g | 113° C. | 45°A |
| 3 | 70 mol-% (32,0 g) FN | 86.0 g | Oily oligomer | — |
| 4 | 30 mol-% (6,3 g) IN | 12.5 g | 104° C. | 60°D |
| 5 | 50 mol-% (7,6 g) N | 12.9 g | 32° C. | 67°D |
| 6 | 7.6 g N + 5.9 g FN | 16.4 g | 43° C. | 45°D |

From Table 1 it can be seen that by using aryl-substituted norbornenes as comonomer the heat resistance (Tg) is better than when using the same amount of norbornene (5). By reducing the amount of phenyl-norbornene in the reaction mixture from 50 mol % (2) to 30 mol % (1) the Shore hardness increased. However, when increasing the amount of phenyl-norbornene to 70 mol % (3) the the concentration of comonomer was so high that an oil-like oligomer was obtained. Indanyl-norbornene (4) is stiffer than phenyl-norbornene (1) and therefore stiffens the polymer chain more efficiently (higher Tg and Shore-hardness). The Shore-hardness for the ethylene-norbornene-phenylnorbornene-terpolymer (6) was lower than for the ethylene-norbornene-copolymer (5) even if the heat resistance was higher. Also the yield of this terpolymer was rather high.

EXAMPLE 3 (references)

Ethylene-norbornene-copolymers used as reference-materials.

Ethylene and norbornene were copolymerized in the same way as in Example 1 but the toluene solution was 250 ml and different polymerization conditions were used. The amount of MAO was 3000 Al/Zr in all runs except run 15 where it was 6000 Al/Zr.

TABLE 2

The heat resistance and hardness of ethylene-norbornene-copolymers

| Run | Comonomer | P ata | T ° C. | Cat. mg | Time h | Yield g | Tg ° C. | Shore-hardness |
|---|---|---|---|---|---|---|---|---|
| 7 | 50 mol-% | 2 | 30 | 2 | 1 | 12,5 | 39 | 69° D |
| 8 | 50 mol-% | 2 | 50 | 2 | 1 | 3,6 | <0 | 66° D |
| 9 | 50 mol-% | 4 | 30 | 2 | 1 | 16,8 | <0 | 68° D |
| 10 | 50 mol-% | 4 | 50 | 2 | 1 | 24,6 | <0 | 65° D |
| 11 | 70 mol-% | 4 | 30 | 2 | 1 | 22,3 | 90 | 71° D |
| 12 | 70 mol-% | 4 | 50 | 2 | 1 | 23,5 | 85 | 77° D |
| 13 | 70 mol-% | 4 | 30 | 2 | 0,5 | 15,3 | 90 | 74° D |
| 14 | 70 mol-% | 4 | 30 | 4 | 0,5 | 17,3 | 101 | 75° D |
| 15 | 70 mol-% | 4 | 30 | 2 | 0,5 | 13,1 | 93 | 72° D |
| 16 | 50 g | 4 | 30 | 4 | 0,5 | 11,0 | 124 | 77° D |
| 17 | 70 g | 4 | 30 | 4 | 0,5 | 15,5 | 142 | 82° D |
| 18 | 90 g | 4 | 30 | 4 | 0,5 | 3,5 | 155 | 84° D |

From Table 2 it can seen that all ethylene-norbornene-copolymers were very hard and when their Tg:s were above room temperature their compression moulded plaques were also so brittle that they broke when folded. Only by adding large amounts of norbornene can Tg:s over 100° C. be obtained. When using 50 mol % norbornene or less the heat resistance was very poor. When the Tg increased also the Shore hardness increased.

EXAMPLE 4

Ethylene and phenyl-norbornene were copolymerized in the same way as in Example 1 and the characterization was done in the same way as in Example 2, but the polymerization parameters were changed one at a time.

TABLE 3

The influence of different polymerization parameters on the heat resistance and Shore hardness of ethylene-phenylnorbornene-copolymers

| Run | Comonomer g | "New" conditions | Yield g | Tg ° C. | Shore-hardness |
|---|---|---|---|---|---|
| 19 | 10 | 30° C., 0,5 h | 14,5 | 51 | 49° A/13° D |
| 20 | 10 | 50° C., 0,5 h | 14,8 | 29 | 70° A/25° D |
| 21 | 10 | 30° C., 0,5 h 1 mg cat. A | 7,7 | <0 | 40° A/9° D |
| 22 | 20 | 30° C., 0,5 H | 11,0 | 40 | 62° A |
| 23 | 20 | 30° C., 1 h | 26,5 | 110 | 37° D |
| 24 | 10 | 30° C., 0,5 h, 2 mg cat. B | 0,2 | 42 | 59° A/19° D |

From Table 3 it can be seen that when using 10 g (42 mol %) phenyl-norbornene (19) the yield was of the same order of magnitude as when using 5.9 g (1, Table 1) even if the polymerization time was only 0.5 h. Also the Tg was higher. By increasing the polymerization temperature to 50° C. (20) the yield remained on the same level but the Tg decreased and the hardness increased. This copolymer was, however, much softer than the ethylene-norbornene-copolymers. When the amount of catalyst was decreased to 1 mg (21) the yield decreased accordingly and the heat rsistance and hardness decreased. In other words very low catalyst- and cocatalyst-concentrations can be used when copolymerizing ethylene and phenyl-norbornene and also less comonomer is needed compared to the copolymerization of ethylene and norbornene. These are very great advantages from a production and economical point of view.

When the amount of phenyl-norbornene was 20 g (59 mol %) (22) the yield and Tg were lower but the polymer was harder than when using 10 g (19). This amount of phenylnorbornene in relation to ethylene is clearly too high under these conditions. When polymerizing for 1 h (23) under the same conditions the yield was, however, very high and the Tg was higher. In this case a large amount of ethylene was consumed at the end of the polymerization and the temperature increased. In other words, the concentration of the polymer solution was so high (too much catalyst and cocatalyst under these conditions) that the reaction accelerated. One should, however, notice that by using 20 g phenylnorbornene one can obtain Tg.values which are on the same level as when using 50 g norbornene (16). This heat resistant ethylene-phenylnorbornene-copolymer (23) was, however, also soft and impact resistant. Also by using 2 mg dimnethylsilyl bis (indenyl) zirconium dichloride (catalyst B) as catalyst an ethylene-phenylnorbornene-copolymer (24) was obtained, which had about the same Tg and hardness as when using 2 mg ethylene bis (indenyl) zirconium dichloride (catalyst A), but the yield was considerably lower.

EXAMPLE 5

In this example the impact resistance of copolymers made from ethylene and aryl-substituted norbornenes were compared with those made from ethylene and norbornene. In the previous examples the elasticity of COC was described by the Shore-hardness but in order to describe this property more clearly, also their Charpy impact properties are presented.

TABLE 4

The impact resistance of different COC:s

| Run | Comonomer g | Yield g | Tg °C. | Charpy, kJ/m$^2$ Notched/Unnotched |
|---|---|---|---|---|
| 2 | 13,8 FN | 11,9 | 113 | 25/No break |
| 4 | 6,3 IN | 12,5 | 104 | 5/No break |
| 16 | 50,0 N | 11,0 | 124 | —/ 1,3 kJ/m$^2$ |

From Table 4 it can be seen that by using aryl-substituted norbornenes instead of norbornene a corresponding heat resistance (Tg) can be obtained with much lower amounts of comonomer and the impact resistance is significantly better. COC:s containing aromatic groups can therefore be heat resistant as well as impact resistant and they can be made using rather small amounts of comonomer which decreases the variable costs as well as the investment costs of the production.

The terms and expressions which have been employed are used as terms of description and not of limitation, and there is no intention in the use of such terms and expressions of excluding any equivalent of the features shown and described or portions thereof, it being recognized that various modifications are possible within the scope of the invention.

What is claimed is:

1. An amorphous and impact resistant co/ter polymer copolymerized from olefins and aryl-substituted cyclic monomers using a catalyst, wherein the aryl substituent is a phenyl- or indanyl-group and the catalyst is a metallocene catalyst.

2. The co/ter-polymer of claim 1 wherein said aryl-substituted cyclic monomer is phenyl-norborene (5-phenyl-bicyclo-2,2,1-hept-2-ene).

3. The co/ter-polymer of claim 1 wherein said aryl-substituted cyclic monomer is indanyl-norborene (1,4-methano-1,4,4a,9a-tetrahydrofluorene).

4. The co/ter-polymer of claim 1 wherein the content of aryl-substituted cyclic monomer is 1–90 mol-%.

5. The co/ter-polymer of claim 1 wherein the metallocene catalyst is an ansa-metallocene catalyst and further comprises a cocatalyst of methylaluminoxane (MAO).

6. The co/ter-polymer of claim 1 wherein the metallocene catalyst is ethylene bis (indenyl) zirconium dichloride or dimethylsilyl bis (indenyl) zirconium dichloride.

7. The col/ter-polymer of claim 1 having a glass transition temperature of more than 25° C.

8. The co/ter-polymer of claim 1 having a Shore-hardness of less than 90° A.

9. The co/ter-polymer of claim 1 wherein the olefin is ethylene or propylene.

10. The co/ter-polymer of claim 1 further comprising a third monomer in addition to the olefin and the aryl-substituted cyclic monomer.

11. A process for making a co/ter polymer comprising copolyermizing an olefin and an aryl-substituted cyclic monomer, wherein the cyclic monomer is a phenyl- or indanyl-substituted cyclic monomer and the catalyst is a metallocene catalyst.

12. The process of claim 11 wherein the catalyst is of the ansa-metallocene type and further comprising a cocatalyst which is methylaluminoxane.

13. The process of claim 11 wherein the cyclic monomer is phenyl-norborene (5-phenyl-bicyclo-2,2,1-hept-2-ene) or indanyl-norborene (1,4-methano-1,9a,4,4a-tetrahydrofluorene).

14. The process of claim 13, wherein the concentration of substituted monomer is 1–90 mol %.

15. The process of claim 11, wherein the catalyst is ethylene bis (indenyl) zirconium dichloride or dimethylsilyl bis (indenyl) zirconium dichloride.

16. A method of improving impact resistance of an amorphous co/ter-polymer made from an olefin and an aryl-substituted cyclic monomer, comprising:

polymerizing the olefin and cyclic monomer wherein the cyclic monomer is substituted with a phenyl- or indanyl-group in an amount of 1 to 90 mole-% of the polymer in the presence of a metallocene-catalyst.

17. The method of claim 16, wherein the aryl-substituted cyclic monomer is phenyl-norbornene (5-phenyl-bicyclo-2,2,1-hept-ene).

18. The method of claim 16, wherein the aryl-substituted cyclic monomer is indanyl-norbornene (1,4-methano-1,4,4a,9a-tetrahydrofluorene).

19. The method of claim 16, wherein the concentration of the aryl-substituted cyclic monomer is 20–75 mole-%.

20. The method of claim 16, wherein the metallocene catalyst is an ansa-metallocene catalyst and the cocatalyst is methylaluminoxane.

21. The method of claim 16, wherein the metallocene catalyst is ethylene bis (indenyl) zirconium dichloride or dimethylsilyl bis (indenyl zirconium) dichloride.

22. The method of claim 16, wherein the co/ter polymer has a glass transition temperature of more than 25° C.

23. The method according of claim 16, wherein the co/ter-polymer has a Shore-hardness of less than 90° A.

24. The method of claim 16, wherein the olefin is ethylene or propylene.

25. The method of claim 16, comprising producing a ter-polymer additionally containing another monomer as comonomer.

* * * * *